May 17, 1955     T. RECORD     2,708,551
TEMPERATURE REGULATOR FOR FAUCETS
Filed April 29, 1952
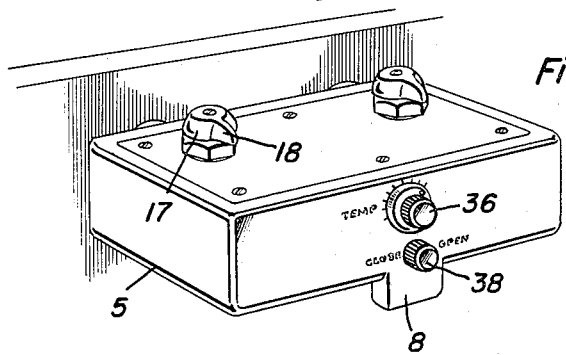
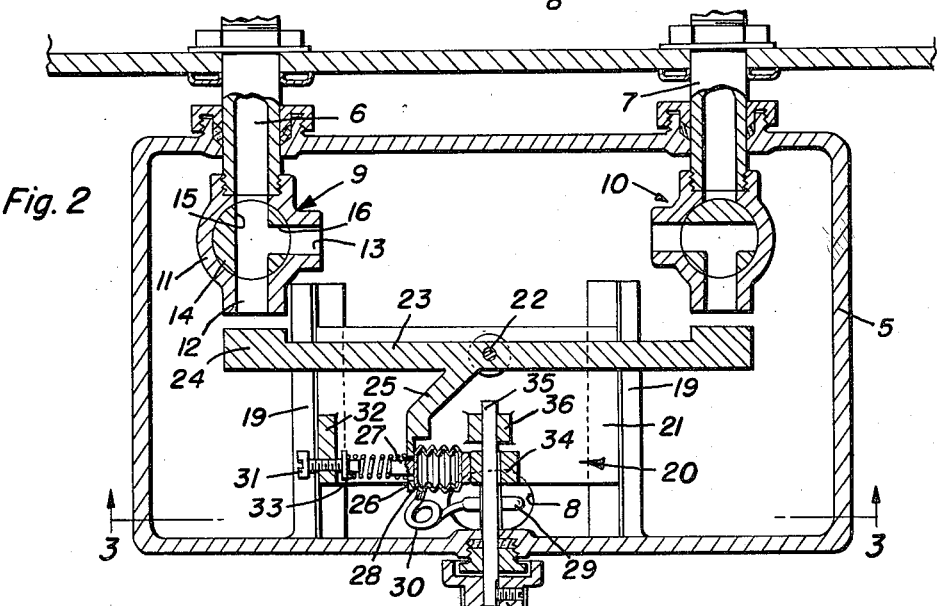
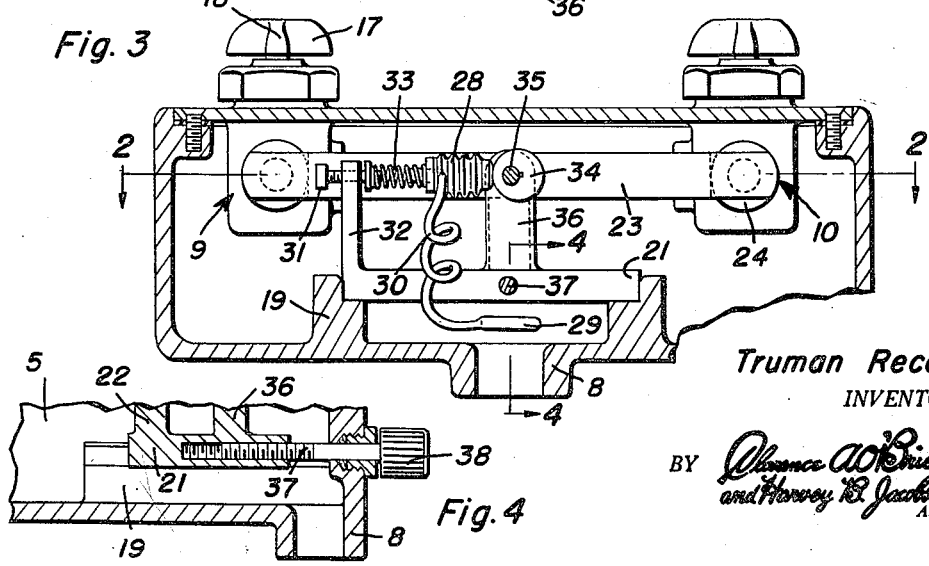
Truman Record
INVENTOR.

United States Patent Office 2,708,551
Patented May 17, 1955

2,708,551

TEMPERATURE REGULATOR FOR FAUCETS

Truman Record, Independence, Mo., assignor of one-third each to G. R. Tompkins and John S. Newhouse, both of Independence, Mo.

Application April 29, 1952, Serial No. 284,889

7 Claims. (Cl. 236—12)

The present invention relates to new and useful improvements in temperature regulators for faucets of wash basins, sinks and the like and more particularly to a mixing chamber to which water from the hot and cold water pipes is supplied and providing thermal responsive means in the chamber to regulate the proportion of hot and cold water admitted thereto.

An important object of the invention is to provide combined manual and thermostatic control valves for both the hot and cold water supply pipes whereby the flow of mixed hot and cold water may be manually regulated to either partially or completely cut off the flow, and, at the same time, to automatically regulate the temperature of the flow.

Another object is to provide temperature regulated valves for the hot and cold water supplies which may be manually adjusted to regulate the volume of water admitted to and discharged from the mixing chamber together with independently operated manually controlled valves which also regulate the volume of water admitted to and discharged from the mixing chamber.

A further object is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is an enlarged horizontal sectional view taken on a line 2—2 of Figure 3;

Figure 3 is a vertical sectional view taken on a line 3—3 of Figure 2, and

Figure 4 is a fragmentary vertical sectional view taken on a line 4—4 of Figure 3.

Referring now to the drawing in detail, wherein for the purpose of illustration I have disclosed a preferred embodiment of my invention, the numeral 5 designates a substantially rectangular-shaped mixing chamber having hot and cold water supply pipes 6 and 7 entering its rear wall and an outlet spout 8 extending downwardly from its bottom at its forward portion.

The inner ends of pipes 6 and 7 are provided with valves designated generally at 9 and 10 respectively, each valve being of duplicate construction and accordingly a detailed description of one will suffice for both. Each valve includes a housing or body 11 having a pair of outlet ports, 12 and 13 in its side at right angles to each other. A cylinder type rotary valve 14 is housed in body 11 with a passage 15 extending transversely therethrough for registering the port 12 with the supply pipe 6 and a lateral passage 16 which registers at the same time with port 13, when valve 14 is turned in one position, as shown at the left hand side of Figure 2. The valve may also be turned to selectively cut off either port 12 or 13, while the other port remains open and in communication with the supply pipe, or the valve may be closed to cut off both ports 12 and 13 from the supply pipe, as shown at the right hand side of Figure 2. A knob 17, with pointer 18, is connected to the top of valve 14 on top of chamber 5 for manually actuating the valve.

The spout 8 is positioned between a pair of rails 19 which extend toward the rear of chamber 5 and on which a carriage 20 is slidable. The carriage comprises a platform 21 having a post 22 rising therefrom and pivotally supporting a bar 23 for horizontal swinging movement of its ends toward and away from the ports 12 of the respective hot and cold water supply. Valves 24 are carried at the ends of the bar for closing against the ports 12.

An arm 25 extends forwardly at an inclined angle from the central portion of bar 23 and is formed at its front end with an eye 26 to receive a stem 27 with sufficient freedom to prevent binding by the movement of the bar. Stem 27 is formed at one end of a bellows type thermostat 28 having a thermal bulb 29 connected thereto by a tube 30 which supports the bulb adjacent spout 8, the bulb and bellows being liquid charged or adapted to contain a thermally expansible fluid.

An adjusting screw 31 is threaded in an upstanding support 32 rising from platform 21 in alignment with stem 27 and spaced from the latter, and a coil spring 33 is supported under tension at its ends on the stem and screw and bears against eye 26 of arm 25 to hold the same on the bellows and the spring opposes expanding movement of bellows 28.

The end of bellows 28 opposite from stem 27 bears against a cam 34 which is secured to a shaft 35 having rotatable and sliding movement at its rear end in a support 36 rising from platform 21. The front end of shaft 35 extends outwardly at the front of chamber 5 and is provided with a manipulating knob 36 to turn the cam 34 and adjust the degree of expansion or contraction of bellows 28, and to manually adjust bar 23.

Carriage 20 is provided with a feed screw 37 threaded at its rear end in the platform 21 and with the front end of the feed screw extending outwardly at the front of chamber 5 and provided with a manipulation knob 38.

In the operation of the device, hot and cold water is supplied to mixing chamber 5 by pipes 6 and 7 by way of ports 12 or 13 selectively controlled by valves 9 and 10. Water is mixed in chamber 5 and passes therefrom by way of spout 8 and in doing so contacts bulb 29 to expand or contract the thermally responsive fluid therein and which similarly acts on bellows 28. The expanding and contracting motion of bellows 28 is transmitted to arm 25 to swing bar 23 and thus move valve 24 at one end of the bar toward or away from port 12 of one of the valves 9 or 10 and to move valve 24 at the other end of the bar toward or away from the port 12 of the other of said valves 9 or 10 to proportion the flow from said ports and thus regulate the temperature of the hot and cold water entering the mixing chamber.

The volume of water entering the chamber by way of ports 12 may be regulated by turning knob 38 to move carriage 20 forwardly or rearwardly which adjusts valves 24 at both ends of bar 23 simultaneously with respect to ports 12.

The volume of water entering the chamber by way of both ports 12 and 13 of the hot and cold water supply pipes may also be regulated by manipulating valves 9 and 10.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A temperature regulator of the class described comprising a mixing chamber having hot and cold water supply pipes connected thereto and also having an outlet, a manally actuated two-way valve at the inner end of each supply pipe and each valve including a pair of selectively controlled outlet ports, a thermally actuated swingable bar mounted in the chamber, and valve means carried by the bar for one of the outlets of each of said first named valves and oppositely moved into open and closed position with respect thereto.

2. A temperature regulator of the class described comprising a mixing chamber having hot and cold water supply pipes connected thereto and also having an outlet, a rockable thermally actuated member in the chamber and including valve means for both supply pipes and oppositely movable into open and closed position, and manually operable means for regulating the opening and closing of said valve means, said last named means including a carriage slidably mounted in the chamber and on which the rockable member, as well as the thermoactuating means therefor is supported, and means externally of the chamber for adjusting the carriage.

3. A temperature regulator of the class described comprising a mixing chamber having hot and cold water supply pipes leading into the chamber and also having an outlet, a manually operated valve at the inner end of each supply pipe, each of said valves including an outlet, a carriage slidably supported in the chamber, a rockable bar mounted on the carriage and having discharge regulating means at its end portions for closing the outlets of the respective valves, thermally responsive means mounted on the carriage and connected to the bar to rockably actuate the bar for oppositely regulating the opening and closing position of the ends of the bar, and manually actuated means connected to the carriage to uniformly move both ends of the bar into and out of valve closing position.

4. A temperature regulator of the class described comprising a mixing chamber having hot and cold water supply pipes leading into the chamber and also having an outlet, a manually operated valve at the inner end of each supply pipe, each of said valves including an outlet, a platform slidably mounted in the chamber, a rockable bar mounted on the platform and having valve means at its end portions movable into and out of closing position with respect to the outlets of the respective first named valves, thermally responsive means mounted on the platform and connected to the bar to rockably actuate the bar for oppositely regulating the opening and closing position of the valve means carried by the bar, and manually actuated means connected to the platform to uniformly move the valve means at both ends of the bar into and out of closing position.

5. A temperature regulator of the class described comprising a mixing chamber having hot and cold water supply pipes leading into the chamber and also having an outlet, a manually operated valve at the inner end of each supply pipe, each of said valves including an outlet, a carriage slidably supported in the chamber, a rockable bar mounted on the carriage and having discharge regulating means at its end portions for closing the outlets of the respective valves, thermally responsive means mounted on the carriage and connected to the bar to rockably actuate the bar for oppositely regulating the opening and closing position of the ends of the bar, manual adjusting means exteriorly of the chamber for the thermally responsive means to regulate the responsiveness of the latter, and manually actuated means connected to the carriage to uniformly move both ends of the bar into and out of closing position.

6. A temperature regulator of the class described comprising a mixing chamber having hot and cold water supply pipes leading into the chamber and also having an outlet, a carriage slidably supported in the chamber, a rockable bar mounted on the carriage and having valve means at its end portions controlling the supply pipes, an arm on the bar, a thermally responsive member engaging the arm and also mounted on the carriage for assembly of the bar and said thermally responsive member as a unit with the carriage in the chamber, manual adjusting means exteriorly of the chamber for said member and manually actuated means connected to the carriage to adjust the bar bodily relative to the discharge ends of the supply pipes.

7. A temperature regulator of the class described comprising a mixing chamber having hot and cold water supply pipes leading into the chamber and also having an outlet, a carriage slidably supported in the chamber, a rockable bar mounted on the carriage and having valve means at its end portions controlling the supply pipes, an arm on the bar, a thermally responsive member supported by the arm and also mounted on the carriage for assembly of the bar and said thermally responsive member as a unit with the carriage in the chamber, a shaft journalled in a wall of the casing and projecting inwardly and outwardly thereof, a cam on the inner end of the shaft and engaging the thermally responsive member to regulate responsiveness of the latter, manual manipulating means on the outer end of the shaft and manually actuated means connected to the carriage to adjust the bar bodily relative to the discharge ends of the supply pipes.

References Cited in the file of this patent

UNITED STATES PATENTS

| 1,153,547 | Finney | Sept. 14, 1915 |
| 1,476,718 | Leonard | Dec. 11, 1923 |
| 1,954,903 | Walker | Apr. 17, 1934 |
| 2,250,815 | Ruegg | July 29, 1941 |
| 2,433,466 | Littlejohn | Dec. 30, 1947 |

FOREIGN PATENTS

| 522,577 | Great Britain | June 21, 1940 |